Figure 1:
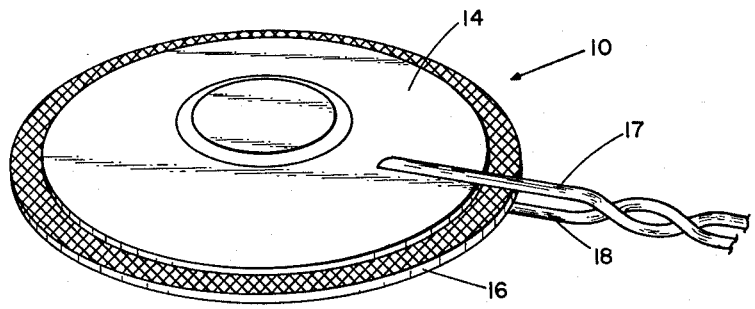

Nov. 24, 1964     D. W. BARGEN     3,158,828

THERMISTOR

Filed May 7, 1963

INVENTOR.
David W. Bargen

BY *Mueller & Aichele*

ATTY'S

3,158,828
THERMISTOR
David W. Bargen, Scottsdale, Ariz., assignor to Motorola, Inc., Chicago, Ill., a corporation of Illinois
Filed May 7, 1963, Ser. No. 278,564
6 Claims. (Cl. 338—28)

This invention relates to packaging of thermistors and other semiconductor devices, and in particular relates to an improved package for thermistors adapted to be embedded in the windings of dynamoelectric machines to provide over-temperature protection.

The windings of motors and other dynamoelectric machines should be protected from temperatures that will unduly shorten their life. The conditions that are most likely to cause a motor to overheat are: overloads which produce high running currents in the windings; stalling of the rotor; and loss of a phase in polyphase machines. Over-temperature protection for motors, and other machines and devices having windings susceptible to overheating, may be provided by means of a thermistor placed in the winding and connected in a control circuit. The resistance of the thermistor undergoes a large and abrupt change when the winding reaches a limiting temperature safely below the inherent temperature limitation of the motor. This resistance change causes the control circuit to interrupt the circuit path through which power is supplied to the motor so that the motor will stop, allowing it to cool. It may be restarted automatically or manually.

The resistance of the thermistor may either increase or decrease with increasing temperature, i.e., it may have either a positive or a negative temperature coefficient. In both types it is important that the thermistor have a fast thermal response because it must activate the control circuit in time to prevent overheating when the temperature of the motor is rising rapidly. The thermal response of the thermistor must be especially fast if it is to be used to protect motors having a fast rate of temperature rise, for example, a rate of 10° C. per second or higher.

The heart of the thermistor is a semiconductive element, typically a barium titanate composition, which has metal contacts, and lead wires connected to the contacts. Clearly, anything added to protect the thermistor, such as plastic encapsulation or a can, slows down its thermal response because heat from the windings must be transferred to the semiconductor through the encapsulation. In some cases the problem may be alleviated by reducing the size of the thermistor. However, most motor protection applications require that the thermistor dissipate substantial amounts of power, and in view of this limitation, the size of the thermistor cannot be reduced to the extent required to provide the desired degree of thermal response.

On the other hand, a bare thermistor (i.e., unencapsulated) is not necessarily the best approach for motor protection applications. As placed in the winding, the bare thermistor may have poor thermal contact with individual wires such that optimum heat transfer conditions are not achieved. The response is improved if the bare thermistor is soldered directly to the copper of the windings because the solder connection has low thermal resistance. The solder connection taps the thermistor into the winding such that electrical power for the control circuit is derived from the winding and there is no separate power supply for the control circuit.

Unfortunately, a number of practical problems have been encountered with this solder mounting approach. First, there is a possibility for error since the thermistor must be tapped into the right voltage point in the winding. As a practical matter, this means that the effectiveness of the motor protection depends critically on the reliability of the individual assembly worker who accomplishes the soldering. In addition, it takes some finesse to do the soldering without cracking the semiconductor element, and this is not accomplished easily on the production line for assembling the motor. Improper soldering can also change the thermistor characteristics through chemical contamination and other causes, thereby adversely affecting the system operation. As previously mentioned, it is desirable in some applications for the thermistor to have a large change of resistance for a small change of temperature at the limiting temperature range so that a definite switching action will be achieved. Consequently, the range and slope of the thermistor's characteristic curve should be maximized. In general, it has been found that soldering a bare thermistor to the winding is not the best solution for increasing the thermal response of the thermistor.

It is an object of this invention to shorten the response time of thermistors without unduly limiting their power dissipation capabilities.

Another object of the invention is to provide a thermistor having a faster thermal response than unsoldered bare thermistors and plastic encapsulated thermistors of equivalent size.

It is also an object of the invention to provide a metal package for thermistors which is especially adapted to be embedded in an electrical winding, and which does not have to be soldered to the winding in order to provide adequate thermal response.

In its essence, the invention is a thermistor with a sealed metal-foil package having an extended metal surface for increasing the area of thermal contact between the thermistor and a winding in which it is to be embedded. The extended metal surface is deformable such that it will conform to the wires of the winding in which it is placed, and the metal of the package is thin, all of which contributes to a fast thermal response which is characteristic of the metal-foil packaged thermistor. A particular embodiment of the invention has a piece of foil soldered to each side of the semiconductor element with the foils aligned with each other and with their borders extending beyond the edge of the semiconductor element. The extension or border portions of the foils are sealed by a separator impregnated with thermosetting resin material which is placed between them, and the effectiveness of the seal is enhanced by the relatively large area of contact which exists between the resin and the foils. Lead wires are soldered to the foils such that the foils serve both as electrical and thermal connections to the semiconductor element. The separator projects slightly beyond the boundary of the foils, so the package has no sharp metal corners which might damage the insulation of the winding in which the thermistor is ultimately embedded, a factor which improves the reliability of a motor or other machine in which the thermistor is used to provide thermal protection.

Figure 2:
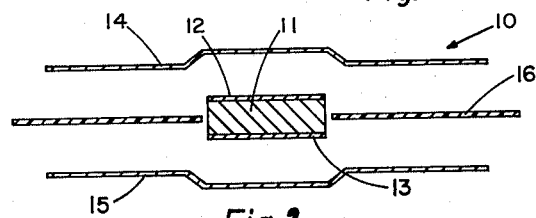

Referring to the drawings, a metal-foil packaged thermistor which constitutes a preferred embodiment of the invention is shown in perspective in FIG. 1 and in an exploded view in FIG. 2. The thermistor 10 includes a semiconductor element 11 (FIG. 2) in the form of a cylindrical pellet which has metal contacts 12 and 13 on its upper and lower faces. The cylindrical shape of the pellet is convenient but not essential. Positive temperature coefficient (PTC) thermistors are preferred for some thermal protection applications, and the metal-foil package of FIGS. 1 and 2 has been applied successfully to thermistors of this type. The utility of the package is not limited to PTC thermistors, however. Ceramic semiconductive compositions and suitable metal contacts for PTC thermistors have been described in the literature, for example in an article entitled "Oxide Thermistors With Large Positive Temperature Coefficients" by H. A. Sauer and S. S.

Flaschen, Ceramic Industry, vol. 66, page 95 (1956) and another article entitled "Choice of Electrodes in Study and Use of Ceramic Semiconducting Oxides" by H. A. Sauer and S. S. Flaschen, The American Ceramic Society Bulletin, vol. 39, No. 6, pages 304–306, June 1960.

Examples of suitable compositions for the ceramic semiconductor element of PTC thermistors are as follows:

$Ba_{.640}Sr_{.357}La_{.006}Ti_{1.06}O_3$
$Ba_{.800}Sr_{.197}La_{.006}Ti_{1.06}O_3$
$Ba_{.950}Sr_{.047}La_{.006}Ti_{1.06}O_3$
$Ba_{1.0}Ti_{1.06}Sb_{.006}O_3$

Satisfactory metal contacts to the semiconductor element have been made by electroless plating of nickel on opposite faces of the element.

The package for the thermistor illustrated in FIGS. 1 and 2 consists of two foils 14 and 15 preferably of copper which are soldered at their central parts to the metal contacts 12 and 13, and which are sealed around their peripheral portions by means of a separator 16 of fibrous material, e.g., glass fiber, impregnated with thermosetting resin. The term "foil" as used in this specification and the claims which follow means a sheet of metal having a thickness of about 10 mils or less. The foils 14 and 15 are usually circular disks, but the circular shape is not essential. Lead wires 17 and 18 are soldered respectively to the foil disks 14 and 15 to provide electrical connections to the element 11.

Figure 3:
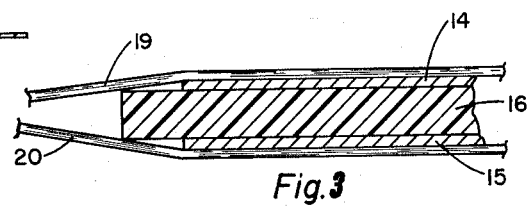

The separator 16 projects slightly beyond the rims of the foil disks 14 and 15 as shown in FIGS. 1 and 2 such that the package has no sharp metallic edge at its perimeter. When the thermistor is embedded in a winding of a motor, for example, the wires 19 and 20 which are in contact with the thermistor as shown in FIG. 3 do not cross a sharp metallic edge capable of cutting their insulation, so there is no tendency for the thermistor to damage the insulation on the wires.

The foil disks 14 and 15 have been formed around the edge of the ceramic pellet so that the pellet is more or less wrapped in the foil. The separator 16 gives the peripheral portion of the package sufficient stiffness that it will hold its shape, but the package can be deformed easily so that it will conform to the wires of the winding in which it is ultimately embedded, as previously noted. Since the package has a considerably larger overall area than the pellet itself, and since it conforms to the surrounding wires, it is easy to provide good thermal contact between the thermistor and a winding. The package itself has low thermal resistance due to the thinness of the foil, typically about two mils, and the thermal time constant of the thermistor when properly installed in a motor winding is approximately three seconds. By way of comparison, competitive commercially available thermistors having a thin plastic coating directly on the pellet have a thermal time constant, when embedded in a winding, of approximately 12 seconds.

Figure 4:
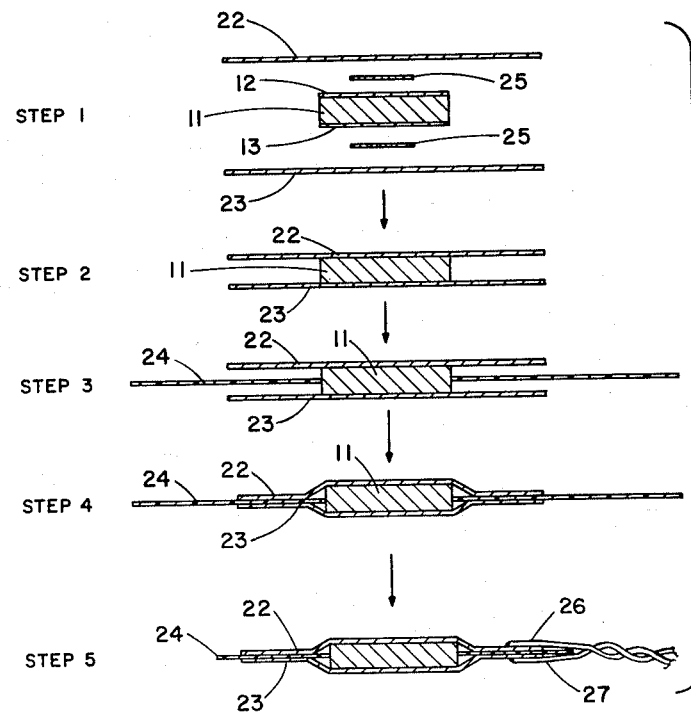

FIG. 4 shows the steps of a preferred method of fabricating the thermistor 10 of FIGS. 1 and 2. Two foil disks 22 and 23 are cut from .002 inch copper sheet to a diameter of about seven-eighths inch. The disks should be kept as flat as possible and free from fingerprints or other contamination. The disks 22 and 23 are assembled with solder preforms 25 and a semiconductive pellet 11 in a soldering jig (not shown) such that the foil disks are on opposite sides of the pellet with solder preforms between the pellet and the copper disks. An exploded view of this assembly is shown at Step 1 of FIG. 4. If desired, the pellet may be pre-tinned to provide solder on its contact faces 12 and 13 rather than using separate solder preforms. A drop of suitable flux, such as 20% hydrochloric acid, is placed on the solder or on the center of the foil disks 22 and 23. The assembly is heated at a temperature above the melting point of the solder, for example, about 275° C., and is then cooled to solidify the solder joints. A small fillet of solder should be visible on both sides of the pellet, and the pellet and disks 22 and 23 should be concentric after the soldering step as shown at Step 2 of FIG. 4.

A glass-fiber sheet 24 impregnated with a thermosetting epoxy resin is then inserted between the extended portions of the disks 22 and 23 and encircles the pellet 11 as shown at Step 3 in FIG. 4. The sheet has a hole at its center to accommodate the pellet, and it is slit radially so that it may be slipped around the pellet. If desired, two such sheets may be placed with the slits at a 90° angle with respect to each other in order to insure a tight seal. The resulting assembly is then placed in a hydroforming press between two rubber blocks which have faces parallel to each other. The press is closed, and the rubber blocks form the extended portions of the foil disks around the sides of the pellet 11 and against the epoxy-impregnated sheet 24 producing an assembly with a configuration as shown at Step 4 in FIG. 4. Note that the peripheral portions of the disks and the insulating sheet 24 form a fin-like projection which increases the thermal contact area of the thermistor over that of the pellet 11. This assembly is placed in a laminating press heated at a temperature of approximately 325° C. to 350° C. in order to seal the package. In a specific example, the assembly remains in the laminating press for about five minutes in order to advance the cure of the epoxy resin until the copper material adheres firmly to the insulating sheet. The epoxy resin of the insulating sheet is initially partially cured, and the lamination step advances the cure sufficiently to produce good adherence between the copper and the insulating sheet.

Excess flash is trimmed from the package such that the final overall diameter is about one inch. The final configuration of the package is shown at Step 5 in FIG. 4. The insulating sheet projects from the rim of the copper disks a radial distance of about one-sixteenth inch. The leads 26 and 27 are soldered to the disks 22 and 23 respectively by conventional solder techniques. As a final processing step, the package may be coated with a thermosetting varnish if desired, but the varnish coating is not essential for all applications. The leads are usually twisted together to provide added mechanical strength and ease of handling.

The following specifications for a specific embodiment of the invention are given by way of illustration, and are not intended to limit the invention in any way.

| | |
|---|---|
| Transition Temperature | 100° C. |
| Resistance at 25° C | 50 ohms |
| Temperature Coefficient of Resistance | 13%/° C. |
| Thermal Time Constant— | |
| In still air at 25° C. | 30 sec. |
| Embedded in winding | 3 sec. |

The invention provides a thermistor device, and a metal-foil package for it, which has a thermal response time faster than potted or bare thermistors, and yet which is capable of dissipating a reasonable amount of power. The foil packaged thermistor is simple, rugged and reliable, and can easily be embedded in a motor winding or other winding without soldering the thermistor to the wires of the winding. The thermistor is particularly adapted for over-temperature protection of motors, but is suitable for other applications as well.

I claim:

1. A thermistor device comprising a solid thermistor body of semiconductive material having a specified temperature coefficient of resistance, first and second foil means connected to opposite sides of said body, said foil means being formed partially about said body toward each other and thereby forming an enclosure for said body, and said foil means having border portions projecting from said body substantially parallel to each other and extending around the perimeter of said body to increase the thermal contact area of said thermistor over that of said body, insulating means separating said border portions of said foil means and adherently bonded to said border portions for sealing said enclosure, and electrical connector means connected to said foil means.

2. A thermistor device comprising a solid thermistor body of semiconductive material having a specified temperature coefficient of resistance, first and second foils connected to opposite sides of said body, at least one of said foils being formed partially about said body toward the other of said foils such that said foils nearly enclose said body, said foils having border portions projecting from said body substantially parallel to each other and extending around the perimeter of said body to increase the thermal contact area of said thermistor over that of said body, flexible insulating means separating said border portions of said foils from each other and adherently bonded to said border portions for sealing the enclosure formed by said foils, and electrical connector means connected to said foils and having portions available for making external electrical connections to said thermistor.

3. A thermistor comprising a solid body of semiconductive material having a specified temperature coefficient of resistance, first and second metal-foil disks soldered to opposite sides of said semiconductive body providing thermally conductive and electrically conductive connections to said body, said metal-foil disks each having a portion partially wrapped about said body, and said disks having peripheral portions projecting radially from and circumscribing said body so as to increase the thermal contact area of said thermistor over that of said semiconductive body, an insulating separator between and adhering to said peripheral portions of said disks and encircling said semiconductive body, said separator having enough flexibility to allow said peripheral foil portions to conform to wires of a winding when said thermistor is inserted in such winding, and electrical lead means connected to said metal-foil disks.

4. A thermistor comprising a pellet of semiconductive material having a specified temperature coefficient of resistance, first and second foils soldered to opposite sides of said pellet providing thermally conductive and electrically conductive connections to said pellet, said foils having portions formed partially about said pellet and extending outward from said pellet forming a fin-like projection extending entirely around said pellet, an insulating separator between and adhering to the outwardly extending portions of said foils providing a sealed package for said pellet, and electrical connector means connected to said foils.

5. A thermistor comprising a body of semiconductive material having a specified temperature coefficient of resistance, first and second foils connected to opposite sides of said body, at least one of said foils being partially wrapped about said body toward the other of said foils such that said foils nearly enclose said body, and said foils having border portions projecting from said body substantially parallel to each other so as to increase the thermal contact area of said thermistor over that of said body, an insulating separator between and adherent to said border portions of said foils for sealing the enclosure formed by said foils, said separator extending slightly beyond the outer boundary of said foils and being flexible such that said thermistor will conform to the wires of an electrical winding when embedded therein, and electrical connector means connected to said foils.

6. A thermistor comprising a body of semiconductive material having a specified temperature coefficient of resistance, first and second foils connected to opposite sides of said body, at least one of said foils being formed partly around said body toward the other of said foils such that said foils nearly enclose said body, and said foils having border portions extending from said body substantially parallel to each other so as to increase the thermal contact area of said thermistor over that of said body, an insulating separator comprised of a fibrous sheet impregnated with thermosetting resin material, with said separator lying between and adhering to said border portions of said foils for sealing the enclosure formed by said foils and insulating said border portions from each other, said separator and said foils being sufficiently flexible to allow said thermistor to conform to the wires of an electrical winding when embedded therein, and electrical connector means connected to said foils.

References Cited in the file of this patent
UNITED STATES PATENTS

| | | |
|---|---|---|
| 2,707,223 | Hollmann | Apr. 26, 1955 |
| 2,880,295 | Huffman | Mar. 31, 1959 |
| 3,085,216 | Melton | Apr. 9, 1963 |